Nov 24, 1953
J. E. HILL
2,660,706
APPARATUS FOR MEASURING POWER AND
STANDING WAVES IN WAVE GUIDES
Filed June 25, 1945
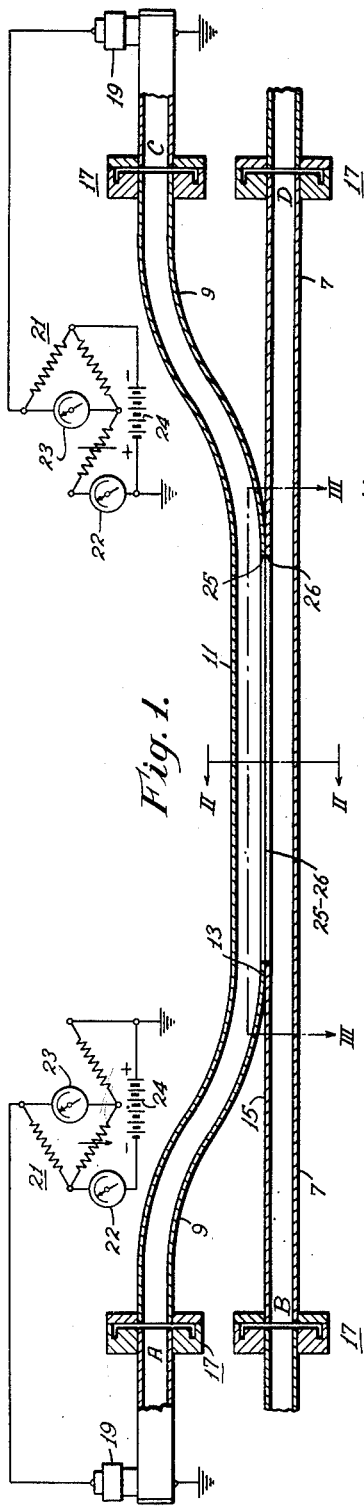
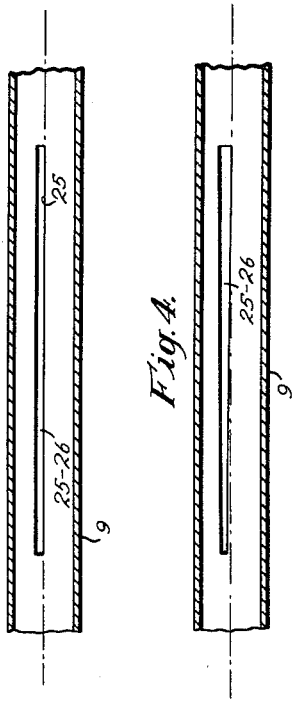
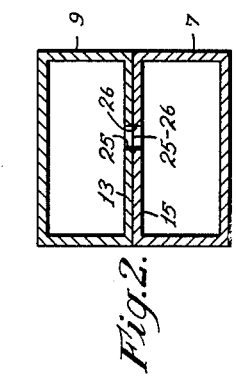
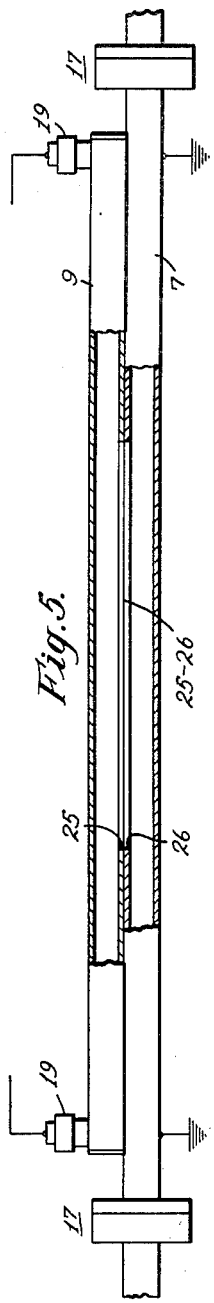
INVENTOR
Jerald E. Hill.
BY
F. W. Lyle
ATTORNEY Patented Nov. 24, 1953

2,660,706

UNITED STATES PATENT OFFICE 2,660,706

APPARATUS FOR MEASURING POWER AND STANDING WAVES IN WAVE GUIDES

Jerald E. Hill, Forest Hills, Pa., assignor to Westinghouse Electric Corporation, East Pittsburgh, Pa., a corporation of Pennsylvania Application June 25, 1945, Serial No. 601,424

20 Claims. (Cl. 324—95)

This invention relates to measuring apparatus and has particular relation to apparatus for measuring power through an ultra-high-frequency transmission line and detecting the presence of standing waves in that line.

Standing wave detectors for ultra-high-frequency systems constructed in accordance with the teachings of the prior art have a probe inserted through a slot into a hollow wave guide transmission line. The probe is adapted to be moved back and forth along the slot with the operator taking readings of the maximum and minimum amplitude points in the standing wave pattern from which the standing wave ratio may be computed. Such detectors are relatively expensive as an accurate mechanical unit must be constructed to obtain reasonable accuracy. Moreover, the use of such detectors in ultra-high-frequency systems, such as in radar equipment, gives rise to certain difficulties. The location of the detector is often such that it is not readily accessible to the operator. In addition, the operator must move the probe manually to make two different readings and then compute the standing wave ratio. Such an operation is tedious and requires considerable time and is obviously undesirable from this standpoint.

Prior art methods for monitoring the power which is transmitted along a hollow wave guide in an ultra-high-frequency system involves the use of a small probe introduced into the wave guide or a T joint with a small coupling hole or slot with an associated measuring device. Such an arrangement provides an accurate measure of the power but is disadvantageous in that the ratio of the small fraction of power removed for monitoring purposes to that being transmitted depends on the standing wave ratio and the position of the standing wave in the main transmission line. In addition, the ratio of power for monitoring to that transmitted is quite strongly dependent upon the frequency.

It is, accordingly, an object of my invention to provide new and improved apparatus for detecting the presence of a standing wave in a hollow wave guide.

Another object of my invention is to provide novel apparatus for indicating the standing wave ratio in a hollow wave guide.

A further object of my invention is to provide a new and improved apparatus for indicating the standing wave ratio in a wave guide at any desired distance from the guide.

Still another object of my invention is to provide improved apparatus for detecting the presence of standing waves in a guide which does not require any moving parts.

A still further object of my invention is to provide novel apparatus for monitoring the power transmitted along a hollow wave guide.

Another object of my invention is to provide novel apparatus for monitoring the power transmitted along a hollow wave guide which is practically independent of the standing wave ratio.

Another objected of my invention is to provide novel apparatus for monitoring the power transmitted along a hollow wave guide which is practically independent of the standing wave ratio and the position of the standing wave.

Another object of my invention is to provide novel apparatus for monitoring power transmitted along a hollow wave guide which is operable over a broad frequency band.

It is also an object of my invention to provide novel apparatus for monitoring power transmitted through a hollow wave guide and indicating the standing wave ratio in that guide.

In accordance with my invention, I provide an auxiliary hollow wave guide adjacent to the main guide with a coupling therebetween to introduce energy from the main guide into the auxiliary guide at a plurality of points. The coupling is so arranged that approximately all of the energy introduced into the auxiliary guide in response to any given wave front proceeding along the main guide is substantially in phase with a wave propagated in one direction along the auxiliary guide as a result of the introduction of said energy, and that approximately one-half of the introduced energy is 180° out of phase with a wave which the remainder of the introduced energy tends to propagate in the opposite direction. Means are then provided for measuring the power in the auxiliary guide on each side of the coupling, the power on one side being a measure of the power transmitted through the main guide and the power on the other side being a measure of the standing wave ratio.

The features of my invention which I consider novel are set forth with more particularity in the accompanying claims. The invention itself, however, with respect to the details thereof together with additional objects and advantages may be best understood from the following description of specific embodiments of my invention when read in connection with the accompanying drawings, in which:

Figure 1 is a cross-sectional view of an embodiment of my invention;

Fig. 2 is an enlarged cross-sectional view along lines II—II of Fig. 1;

Fig. 3 is a sectional view along lines III—III of Fig. 1;

Fig. 4 is a sectional view similar to Fig. 3 showing a modified coupling slot; and Fig. 5 is a cross-sectional view of a modification of my invention.

As shown in Figures 1, 2 and 3, a main hollow wave guide section 7 is provided through which electromagnetic waves are to be propagated. An auxiliary hollow wave guide section 9 is positioned adjacent to the main guide section 7 and has a center portion 11 which is parallel to and in engagement with the main guide section 7. The main and auxiliary guide sections 7 and 9 are preferably rectangular in cross-section at right-angles to their respective axis, and one of the wider sides 13 of the main guide section 7 is in engagement with one of the wider sides 15 of the auxiliary guide section 9 over a selected area in said center portion 11. Of course, guides having other cross-sectional shapes may be employed if desired.

The auxiliary guide section 9 is preferably secured to the main guide section 7 as by soldering at the area of engagement therewith. The auxiliary guide section 9 may be bent away from the main guide section on each side of the center portion 11 in engagement with the main guide section 7 to provide clearance for coupling members 17 on the ends of both the main and the auxiliary guide sections. The main guide section 7 is adapted to be coupled in a main transmission line of the ultra-high-frequency system, while a power measuring unit 19 is coupled on each end of the auxiliary guide section 9. Any of the familiar and suitable power measuring units may be used, although I prefer to use one of the bolometer type connected in a Wheatstone bridge circuit 21 supplied through an ammeter 22 from a direct-current source 24 and including a meter 23 on which the power is continuously indicated. The details of the bolometer unit are described in my copending application, Serial No. 601,425, filed June 25, 1945 and now abandoned.

A slot-like opening 25 is provided in the wall 13 of the auxiliary guide section 9 coinciding with a similar opening 26 in the wall 15 of the main guide section 7 in engagement therewith. These two openings 25 and 26 then form a slot 25—26 which functions as a coupling to introduce energy from the main guide section 7 into the auxiliary guide section 9. The location of the slot 25—26 with respect to the center lines of the engaging walls 13 and 15 of the auxiliary and main guide sections 9 and 7 depends upon the degree of coupling desired. If the slot is made symmetrical with respect to the center lines very little coupling is provided, but if the slot is displaced to one side of the center lines the coupling is considerably increased. I prefer to form a rectangular slot 25—26 with one edge thereof along the center lines as in Fig. 3. The amount of coupling also depends upon the width and length of the slot 25—26 as well as upon its depth which, in this case, is the sum of the thicknesses of the walls 13 and 15. The amount of coupling is, of course, chosen with respect to the amount of power required to obtain suitable readings on the meters 23.

Without regard for the amount of coupling between the main and auxiliary guide sections 7 and 9, the length L of the slot 25—26 should be at least equal to $$\frac{\lambda_G}{2}$$

where $\lambda_G$ is the wave length in the guide with $$\lambda_G = \frac{\lambda_e}{\sqrt{1-\left(\frac{\lambda_e}{2b}\right)^2}}$$

where $\lambda_e$ is the wave length in free space and $b$ is the inside width of the guide sections 7 and 9. Preferably the length L is equal to several half-wave lengths and it is desirable that $$L = \frac{n\lambda_G}{2}$$

where $n$ is an integer although as will be explained hereinafter this is not absolutely essential.

To understand the operation of this arrangement, let it be assumed that energy is being propagated from B toward D in the main guide section 7, in the TE$_{01}$ Mode which is customary in such guides, with a matched load at D. It should also be assumed that the power measuring units at A and C on the auxiliary guide section 9 form matched loads and that the length, width and depth of the slot 25—26 are so chosen that the power fed into the auxiliary guide section 9 from the main guide section 7 is a small fraction of that being transmitted down the main guide section 7. Under these conditions, the standing wave ratio in the main guide section 7 is unity.

Now with the slot 25—26 of a length equal to an integral number of half-wave lengths in the guide, its length may be divided into an even number of quarter-wave length elements. Each of these quarter-wave length elements may then be considered as split into an arbitrarily large number of equal small elements with the same number of small elements in each quarter-wave length. Then to find the amplitude at the points A and C in the auxiliary guide section resulting from the coupling through the slot, the contributions of all of the small elements along the length of the slot must be added in the proper phase relationship.

Let point C be considered first, then as any given wave front proceeds in the direction BD along the main guide section 7, each small element in the auxiliary guide section 9 along the slot 25—26 is progressively excited. Since the velocity of propagation of the waves is the same in the main and the auxiliary guide sections 7 and 9, it is clear that the contributions from each of the small elements at the slot 25—26 arrive in phase with each other at point C. In other words, the energy introduced at each of said small elements in the auxiliary guide section 9 at the slot 25—26 in response to the given wave front proceeding from B to D along the main guide section 7 is substantially in phase with a wave propagated toward point C in the auxiliary guide section 9 as a result of the introduction of energy therein. Thus, the amplitude of the wave at C is the algebraic sum of the contributions from all the small elements in the direction from A to C. Consequently, the meter 23 associated with the power measuring unit 19 at C gives an indication $P_C$ which is proportional to the power being propagated along the main guide section 7 from B to D.

In considering the contributions of energy from all of the small elements at the slot 25—26 to a wave propagated toward A in the auxiliary guide section 9, it is clear that the contributions from corresponding elements in adjacent quarter-wave length elements are substantially 180° out of phase. If the amplitude of the exciting wave in the main guide section 7 remains substantially constant in traversing a quarter-wave length along the slot 25—26, that is, if very little energy is removed from the main guide section 7, the energy contributed by a small element is substantially equal to that contributed by a corresponding element in an adjacent quarter-wave length element, and since they are 180° out of phase, the two cancel each other. It is then apparent that if there is exactly an even number of quarter-wave length elements in the slot, approximately one-half of the energy introduced into the auxiliary guide section 9 is substantially 180° out of phase with a wave which the remainder of the introduced energy tends to propagate toward the point A. It follows that there is no power at the point A under the assumed conditions and the meter 23 associated with the power measuring unit 19 at A has a zero reading.

If the power to be withdrawn from the main guide section 7 for the auxiliary guide section 9 is an appreciable fraction of that available, there will be a small energy flow toward the point A in the auxiliary guide section since the energy contributions of adjacent quarter-wave elements are not then exactly equal. To counteract this effect which results from the decrease in amplitude of the exciting field as it proceeds from one quarter-wave length element to the next, the slot 25—26 may be tapered in the direction from B to D as shown in Fig. 4. By tapering the slot, it is possible to maintain equal amplitudes of the contributions from corresponding small elements in adjacent quarter-wave length elements. However, in most practical applications, I have found that it is not necessary to taper the slot as the attenuation of the wave in the main guide section per quarter-wave length of slot may be very small since extremely sensitive power indicating devices may be used at points A and C in the auxiliary guide section.

It is to be noted that for best operation the length of the slot 25—26 in addition to being equal to an integral number of half-wave lengths in the guide should also be equal to an odd number of quarter-wave lengths in free space. Such an arrangement can be accomplished because the free space wave length and the wave guide wave lengths are not the same. This particular length of the slot 25—26 is desirable because those slots which have a length equal to an integral number of half-wave lengths in free space tend to become resonant and interfere with the operation of the apparatus. It should also be pointed out that if the coupling per quarter-wave length of the slot is kept small and the slot is made very long to obtain the required total transfer of energy from the main guide section to the auxiliary guide section, then the restriction of the slot length to an integral number of half-wave lengths within the guide becomes considerably less important since any contribution from the last quarter-wave length element or fraction thereof which is not canceled becomes an extremely small fraction of the total power transferred to the auxiliary guide section.

Let it be assumed that the load at the point D in the main guide section is mismatched so that while energy is propagated from B toward D in the main guide section, there is also a reflected wave from D toward B. Under these conditions, let $X_B$ and $X_D$ represent the respective amplitudes of the incident and reflected waves in the main guide section 7, and let $X_A$ and $X_C$ represent the amplitudes of the waves proceeding through the auxiliary guide section 9 toward A and toward C, respectively. Then if $P_B$, $P_D$, $P_A$ and $P_C$ represent the powers corresponding to the four measured amplitudes, the standing wave ratio R, which is the ratio of the maximum power to the minimum power may be defined by the following equation:

$$R = \left(\frac{X_B + X_D}{X_B - X_D}\right)^2$$

Now $$X_A = kX_D \text{ and } X_C = kX_B$$

where $k$ is the constant factor less than unity, the value of which depends only on the dimensions of the slot and the cross-sectional dimensions of the guide sections. This has been checked by experiment.
Hence, $$R = \left(\frac{\frac{X_C}{k} + \frac{X_A}{k}}{\frac{X_C}{k} - \frac{X_A}{k}}\right)^2 = \left(\frac{X_C + X_A}{X_C - X_A}\right)^2$$

But $$P_A = aX_A^2 \text{ and } P_C = aX_C^2$$

where $a$ is a proportionality factor depending on the sensitivity of the power measuring units at A and C assumed here to be the same in both units.
Therefore, $$R = \left(\frac{\sqrt{\frac{P_C}{a}} + \sqrt{\frac{P_A}{a}}}{\sqrt{\frac{P_C}{a}} - \sqrt{\frac{P_A}{a}}}\right)^2 = \left(\frac{\sqrt{P_C} + \sqrt{P_A}}{\sqrt{P_C} - \sqrt{P_A}}\right)^2$$

Consequently, the readings of the meters 23 at A and C give the standing wave ratio in the main guide if the relative calibrations of the meters are known.

It is also clear that the reading of the meter at C is a measure of the power transmitted down the main guide section when the load at point D is matched. Then the reading of the meter at A is a measure of the standing wave ratio and the meter may be calibrated to indicate the standing-wave ratio directly. If standing-wave ratios near unity are to be measured accurately, it is desirable to have a sensitive meter at A for suppose that R=1.1 then $$P_A = \left(\frac{\sqrt{1.1} - 1}{\sqrt{1.1} + 1}\right)^2 P_C; \; P_A = 5.71 \times 10^{-4} P_C$$

If it is assumed $P_C$ is read on a meter with 100 divisions at approximately full scale for the desired power in the main guide section, then with R in the main guide section equal to 1.1 the deflection of the meter at A would be about 0.06 division if the meters at A and C have the same sensitivity. On the other hand, if the meter at A is 100 times as sensitive as the meter at C then with R=1.1, a 6 division reading is obtained on the meter at A which is ample for practical matching purposes.

It follows that in operation the readings of the meter at A would be observed in adjusting the system to near unity power factor and after it is so adjusted, the meter at C gives a continuous indication of the power through the main guide section.

In apparatus of the type shown in Fig. 1, which was constructed and operated in a system having a 3.2 centimeter wave length, the guide sections had an internal width of .398 inch, a height of .398 inch and the slot was $3\lambda_G$ long with a depth of .100 inch and a width of .125 inch. In this apparatus, the ratio of the power at point C to the power at point B with a matched load at point D was approximately 16.5 db. In other words, about 2% of the power was transferred from the main guide section to the auxiliary guide section. When the apparatus was tested using a magnetron to supply energy to the main guide section with a capillary type water load at the point D and a bolometer and unbalanced bridge at the point C, the bolometer readings were proportional to the water load reading over the entire range of average power output of the magnetron. There is no reason to believe that this proportionality would not continue if the power were increased indefinitely beyond the range of the magnetron.

In the test apparatus it was found that the magnitude if the power at C increases as the standing wave ratio in the main guide section increases by mismatching the load at D even though the source is buffered by 15 db so that the power output remains constant. However, this effect is very small and has no importance in the use of the power at the point C in the manner described since the main guide usually has a substantially matched load at the point D. This can be seen from the following table:

| R | Percent increase in Pc, Pв remaining constant |
|---|---|
| 1.05 | 0 |
| 1.30 | 0.8 |
| 1.50 | 1.5 |
| 2.00 | 3.0 |

Since any practical radar system or other ultra-high-frequency system has a load matched to provide a standing wave ratio no greater than 1.5, the maximum error from this effect in using the power at point C to measure the power through the main guide would be 1.5% which is considerably better than necessary in practical operation.

It was also found in operating the apparatus that if a standing wave exists in the main guide section and the position of the standing wave is moved with respect to the slot, the variation in the reading of power at the point C is very small. For example, with a standing wave ratio of 1.5 in the main guide section, the maximum effect of movement of the position of the standing wave was a 1% variation in the power at point C. Such a small variation is negligible as far as power monitoring is concerned and is, of course, considerably smaller with smaller standing wave ratios.

It was also discovered that while the desired frequency of operation was 9375 megacycles, the frequency could be changed 30 megacycles on either side of the desired frequency with less than 2% change in the power reading at C with the power through the main guide remaining constant. The loads at points C and D were rematched with each new frequency so that the frequency insensitivity presented by this test is purely a property of the apparatus itself. Preferably, the loads at points A and C should have a very low Q, that is, ratio of energy stored to energy dissipated, to take advantage of the insensitivity of the apparatus to frequency changes. As previously indicated, a bolometer power measuring device of the type disclosed in more detail in my aforesaid copending application is quite suitable for this purpose though other measuring devices may be used.

When the test apparatus was operated with a mismatched load at D, it was found that the meter reading at A represented the standing wave ratio near the point B quite accurately as compared with measurements taken with mechanically operated standing wave detectors.

While I have shown the auxiliary guide section bent as in Fig. 1 to afford clearance for coupling connections whereby the main and auxiliary guide sections may be assembled as a unit and inserted as desired in the main guide of the system, such an arrangement obviously is not necessary. In Fig. 5 is shown a modification of my invention in which the auxiliary guide section is a straight guide section 21 secured to a main guide section 33 with a coupling slot 26—26 and power measuring units 19 built into the auxiliary guide. The main guide section 33 may also have coupling elements 17 at its ends so that the apparatus may be built as a unit. The units 19 are, of course, to be connected to bridge circuits similar to bridge 21 in Fig. 1.

It is also to be understood that while a slot-like coupling between the main and auxiliary guide sections is preferred, other coupling arrangements may be used. The coupling, however, should provide an introduction of energy from the main guide section to the auxiliary guide section at a plurality of points with approximately all of the energy so introduced in response to any given wave front proceeding along said main guide section being substantially in phase with a wave propagated in one direction along said auxiliary guide section as a result of the introduction of said energy, and with approximately one-half of the introduced energy being substantially 180° out of phase with a wave which the remainder of the introduced energy tends to propagate in the opposite direction.

From the foregoing description, it appears that I have provided a single apparatus for indicating both the power through the main guide and the standing wave ratio therein. This apparatus has no moving parts other than the meter elements and gives a continuous indication of the standing wave ratios and powers on calibrated meters which can be placed on a control panel at any desired distance from the main guide. In addition, the apparatus is practically independent of both the standing wave ratios and the position of the standing wave insofar as measurement of the power in the main guide is concerned. The apparatus is relatively insensitive to frequency changes and the entire equipment is more compact and less expensive than that required by the two different instruments previously employed to do the same jobs.

Although I have shown and described specific embodiments of my apparatus, I am aware that many modifications thereof may be made without departing from the spirit of the invention. It is my intention, therefore, that my invention be limited only by the spirit of the invention and the scope of the prior art.

I claim as my invention:

1. Apparatus for use in an ultra-high-frequency system comprising a main hollow wave guide through which electromagnetic waves are to be propagated, an auxiliary hollow wave guide having a portion substantially parallel to and in engagement with said main guide over a selected area, said main and auxiliary guides having openings opposite each other within said area forming a slot-like passageway extending lengthwise of said guides through which energy from said main guide is introduced into said auxiliary guide, the length of said passageway being approximately equal to $n$ times one-half wave length in the guides where $n$ is an integer, and means for measuring the power in said auxiliary guide beyond each end of said passageway.

2. Apparatus for use in an ultra-high-frequency system comprising a main hollow wave guide through which electromagnetic waves are to be propagated in one direction, an auxiliary hollow wave guide having a portion substantially parallel to and in engagement with said main guide over a selected area, said main and auxiliary guides having openings opposite each other within said area forming a slot-like passageway extending lengthwise of said guides through which energy from said main guide is introduced into said auxiliary guide, the length of said passageway being approximately equal to $n$ times one-half wave length in the guides where $n$ is an integer, means for measuring the power through said auxiliary guide beyond one end of said passageway in said one direction including means for indicating that power in terms of power through said main guide, and means for measuring the power through said auxiliary guide beyond the other end of said passageway including means for indicating that power in terms of standing wave ratio in said main guide.

3. Apparatus for use in an ultra-high-frequency system comprising a main hollow wave guide through which electromagnetic waves are to be propagated in one direction, an auxiliary hollow wave guide having a portion substantially parallel to and in engagement with said main guide over a selected area, said main and auxiliary guides having openings opposite each other within said area forming a slot-like passageway extending lengthwise of said guides through which energy from said main guide is introduced into said auxiliary guide, the length of said passageway being approximately equal to $n$ times one-half wave length in the guides where $n$ is an integer and also approximately equal to an odd number of quarter-wave lengths in free space, and means for measuring the power in said auxiliary guide beyond each end of said passageway.

4. Apparatus for use in an ultra-high-frequency system comprising a main hollow wave guide through which electromagnetic waves are to be propagated, an auxiliary hollow wave guide, each of said main and auxiliary guides being substantially rectangular in cross-section perpendicular to its axis and having a pair of long side walls and a pair of short side walls, one of said long walls of said auxiliary guide having a portion thereof substantially parallel to and in engagement with a long wall of said main guide over a selected area with a slot-like opening in said engaging walls within said area and extending lengthwise of said guides through which opening energy from said main guide is introduced into said auxiliary guide, the length of said opening being approximately equal to $n$ times one-half wave length in the guides where $n$ is an integer, and means for measuring the power in said auxiliary guide beyond each end of said opening.

5. Apparatus for use in an ultra-high-frequency system comprising a main hollow wave guide through which electromagnetic waves are to be propagated, an auxiliary hollow wave guide, each of said main and auxiliary guides being substantially rectangular in cross-section perpendicular to its axis and having a pair of long side walls and a pair of short side walls, one of said long walls of said auxiliary guide having a portion thereof substantially parallel to and in engagement with a long wall of said main guide over a selected area with a slot-like opening in said engaging walls within said area and extending lengthwise of said guides through which opening energy from said main guide is introduced into said auxiliary guide, the length of said opening being approximately equal to $n$ times one-half wave length in the guides where $n$ is an integer and also approximately equal to an odd number of quarter-wave lengths in free space, and means for measuring the power in said auxiliary guide beyond each end of said opening.

6. Apparatus for use in an ultra-high-frequency system comprising a main hollow wave guide through which electromagnetic waves are to be propagated in one direction, an auxiliary hollow wave guide having a portion substantially parallel to and in engagement with said main guide over a selected area, said main and auxiliary guides having openings opposite each other within said area forming a slot-like passageway extending lengthwise of said guides through which energy from said main guide is introduced into said auxiliary guide, the width of said passageway gradually increasing in said one direction to provide a substantially uniform transfer of energy to said auxiliary guide throughout the length of said passageway with the length of said passageway being approximately equal to $n$ times one-half wave length in the guides where $n$ is an integer, and means for measuring the power in said auxiliary guide beyond each end of said passageway.

7. Apparatus for use in an ultra-high-frequency system comprising a main hollow wave guide through which electromagnetic waves are to be propagated in one direction, an auxiliary hollow wave guide having a portion substantially parallel to and in engagement with said main guide over a selected area, said main and auxiliary guides having openings opposite each other within said area forming a slot-like passageway extending lengthwise of said guides through which energy from said main guide is introduced into said auxiliary guide, the width of said passageway gradually increasing in said one direction to provide a substantially uniform transfer of energy to said auxiliary guide throughout the length of said passageway with the length of said passageway being approximately equal to $n$ times one-half wave length in the guides where $n$ is an integer and also approximately equal to an odd number of quarter-wave lengths in free space, and means for measuring the power in said auxiliary guide beyond each end of said passageway.

8. Apparatus for use in an ultra-high-frequency system comprising a main hollow wave guide through which electromagnetic waves are to be propagated, an auxiliary hollow wave guide, each of said main and auxiliary guides being substantially rectangular in cross-section perpendicular to its axis and having a pair of long side walls and a pair of short side walls, one of said long walls of said auxiliary guide having a portion thereof substantially parallel to and in engagement with a long wall of said main guide over a selected area with a slot-like opening in said engaging walls within said area and extending lengthwise of said guides through which opening energy from said main guide is introduced into said auxiliary guide, the width of said passageway gradually increasing in said one direction to provide a substantially uniform transfer of energy to said auxiliary guide throughout the length of said passageway with the length of said opening being approximately equal to $n$ times one-half wave length in the guides where $n$ is an integer, and means for measuring the power in said auxiliary guide beyond each end of said opening.

9. Apparatus for use in an ultra-high-frequency system comprising a main hollow wave guide for electromagnetic waves, an auxiliary hollow wave guide adjacent said main guide, said main and auxiliary guides having a coupling therebetween to introduce energy from said main guide into said auxiliary guide at a plurality of pairs of points the spacing between the points of each pair being substantially an odd number of quarter wave lengths of said waves and said points extending lengthwise of said guide a distance greater than several times a quarter wave length of said waves with approximately all of the energy so introduced in response to any given wave front proceeding along said main guide being substantially in phase with a wave propagated in one direction along said auxiliary guide as a result of the introduction of said energy and with approximately one-half of the introduced energy being substantially 180° out of phase with a wave which the remainder of the introduced energy tends to propagate in the opposite direction, and means for measuring the power in said auxiliary guide on each side along said auxiliary guide of said plurality of points.

10. Apparatus for use in an ultra-high-frequency system comprising a main hollow wave guide for electromagnetic waves, an auxiliary hollow wave guide adjacent said main guide, said main and auxiliary guides having a coupling therebetween to introduce energy from said main guide into said auxiliary guide at a plurality of pairs of points located along said auxiliary guide lengthwise over a distance greater than several times a quarter wave length of said waves and the spacing between the points of each pair being substantially an odd number of quarter wave lengths of said waves so that the energy introduced at approximately all of said points in response to any given wave front proceeding along said main guide is substantially in phase with a wave propagated in one direction in said auxiliary guide as a result of the introduction of said energy therein, and that the energy introduced at some of said points is approximately equal to, and substantially 180° out of phase with a wave propagated in the opposite direction by, the energy introduced at the remaining points, and means for measuring the power in said auxiliary guide on each side along said auxiliary guide of said plurality of points.

11. Apparatus for use in an ultra-high-frequency system comprising a main hollow wave guide for electromagnetic waves, an auxiliary hollow wave guide adjacent said main guide, said main and auxiliary guides having a coupling therebetween to introduce energy from a plurality of points in said main guide at a plurality of corresponding pair of points in said auxiliary guide, said points extending lengthwise of said guide a distance greater than several times a quarter wave length of each of said waves and the spacing between the points of each of said pairs being substantially an odd number of quarter wave lengths of said waves so that the energy introduced at each of said points in said auxiliary guide in response to any given wave front proceeding along said main guide is substantially in phase with a wave propagated in one direction in said auxiliary guide by energy introduced at any of the other points therein and the energy introduced at approximately one-half of the points in said auxiliary guide is approximately equal to, and substantially 180° out of phase with a wave propagated in the opposite direction by, the energy introduced at the remaining points in said auxiliary guide, and means for measuring the power in said auxiliary guide on each side along said auxiliary guide of said plurality of points.

12. Apparatus for use in an ultra-high-frequency system comprising a main hollow wave guide for electromagnetic waves, an auxiliary hollow wave guide adjacent said main guide, said main and auxiliary guides having a coupling therebetween to introduce energy from said main guide into said auxiliary guide at a plurality of pairs of points, the spacing between the points of each pair being substantially an odd number of quarter wave lengths of said waves and the points extending lengthwise of said guide a distance greater than several times a quarter wave length of said waves with approximately all of the energy so introduced in response to any given wave front proceeding along said main guide being substantially in phase with a wave propagated in one direction along said auxiliary guide as a result of the introduction of said energy and approximately one-half of the introduced energy being substantially 180° out of phase with a wave which the remainder of the introduced energy tends to propagate in the opposite direction, means for measuring the power through said auxiliary guide in said one direction on one side of said points including means for indicating that power in terms of power through said main guide, and means for measuring the power through said auxiliary guide in said opposite direction on the other side of said points including means for indicating that power in terms of standing wave ratio in said main guide.

13. Apparatus for use in an ultra-high-frequency system comprising a main hollow wave guide through which electromagnetic waves are to be propagated, an auxiliary hollow wave guide in engagement with said main guide over a selected area, said main and auxiliary guides having openings longitudinal of said guides opposite each other within said area and of a length greater than several times one quarter wave length of said waves forming a passageway through which a small fraction of the energy from said main guide is introduced into said auxiliary guide whereby approximately all of the energy so introduced in response to any given wave front proceeding along said main guide is substantially in phase with a wave propagated in one direction in said auxiliary guide as a result of the introduction of said energy with said passageway having a dimension lengthwise of said auxiliary guide such that approximately one-half of said energy is substantially 180° out of phase with a wave which the remainder of said energy tends to propagate in the opposite direction, and means for measuring the power in said auxiliary guide on each side along said auxiliary guide of said openings.

14. Apparatus for use in an ultra-high-frequency system comprising a main hollow wave guide through which electromagnetic waves are to be propagated, an auxiliary hollow wave guide having a portion substantially parallel to and in engagement with said main guide over a selected area, said main and auxiliary guides having openings opposite each other within said area forming a slot-like passageway extending lengthwise of said guides and having a length greater than several times one quarter wave length of said waves through which a small friction of the energy from said main guide is introduced into said auxiliary guide, whereby approximately all of the energy so introduced in response to any given wave front proceeding along said main guide being substantially in phase with a wave propagated in one direction along said auxiliary guide as a result of the introduction of said energy, the length of said passageway being such that approximately one-half of the introduced energy is substantially 180° out of phase with a wave which the remainder of the introduced energy tends to propagate in the opposite direction, and means for measuring the power in said auxiliary guide on each side along said auxiliary guide of said plurality of points.

15. Apparatus for use in an ultra-high-frequency system comprising a main hollow wave guide through which electromagnetic waves are to be propagated, an auxiliary hollow wave guide, each of said main and auxiliary guides being substantially rectangular in cross-section perpendicular to its axis and having a pair of long side walls and a pair of short side walls, one of said long walls of said auxiliary guide having a portion thereof substantially parallel to and in engagement with a long wall of said main guide over a selected area with a slot-like opening in said engaging walls within said area and extending lengthwise of said guides and having a length greater than several times one quarter wave length of said waves through which opening a small portion of the energy from said main guide is introduced into said auxiliary guide whereby approximately all of the energy so introduced in response to any given wave front proceeding along said main guide being substantially in phase with a wave propagated in one direction along said auxiliary guide as a result of the introduction of said energy, the length of said opening being such that approximately one-half of the introduced energy is substantially 180° out of phase with a wave which the remainder of the introduced energy tends to propagate in the opposite direction, and means for measuring the power in said auxiliary guide on each side along said auxiliary guide of said plurality of points.

16. Apparatus for use in an ultra-high-frequency system comprising a main hollow wave guide through which electromagnetic waves are to be propagated, an auxiliary hollow wave guide, each of said main and auxiliary guides being substantially rectangular in cross-section perpendicular to its axis and having a pair of long side walls and a pair of short side walls, one of said long walls of said auxiliary guide having a portion thereof substantially parallel to and in engagement with a long wall of said main guide over a selected area with a slot-like opening in said engaging walls within said area and extending lengthwise of said guides through which opening energy from said main guide is introduced into said auxiliary guide, said opening being displaced transversely with respect to the longitudinal center line of said long wall, the length of said opening being approximately equal to $n$ times one-half wave length in the guides where $n$ is an integer, and means for measuring the power in said auxiliary guide beyond each end of said opening.

17. Apparatus for use in an ultra-high-frequency system comprising a main hollow wave guide through which electromagnetic waves are to be propagated, an auxiliary hollow wave guide, each of said main and auxiliary guides being substantially rectangular in cross-section perpendicular to its axis and one of the walls of said auxiliary guide having a portion thereof substantially parallel to and in engagement with a corresponding wall of said main guide over a selected area with a slot-like opening in said engaging walls within said area and extending lengthwise of said guides through which opening energy from said main guide is introduced into said auxiliary guide, said opening being displaced transversely with respect to the longitudinal center line of said engaging walls, the length of said opening being approximately equal to $n$ times one-half wave length in the guides where $n$ is an integer, and means for measuring the power in said auxiliary guide beyond each end of said opening.

18. High frequency measuring apparatus responsive to the power flow in a predetermined direction through an ultra-high-frequency wave guide of rectangular cross section, comprising a second wave guide of rectangular cross section communicating with said first guide along one side of each of said guides through a slot long compared to the operating wavelength in said first guide, said slot being displaced with respect to the longitudinal center lines of the sides along which said guides communicate, a terminating impedance at one end of said second guide, means for deriving a signal proportional to the amplitude and independent of the polarity of the electromagnetic field of energy flowing in said second guide connected at the other end of said second guide, and an output circuit connected to said deriving means.

19. High frequency measuring apparatus responsive to the power flow in a predetermined direction through an ultra-high-frequency wave guide comprising a second wave guide communicating through a slot long compared to the operating wavelength in said first guide, said slot being tapered in said direction, a terminating impedance at one end of said second guide, means for deriving a signal proportional to the amplitude and independent of the polarity of the electromagnetic field of energy flowing in said second guide connected at the other end of said second guide, and an output circuit connected to said deriving means.

20. High frequency measuring apparatus responsive to the power flow in a predetermined direction through an ultra-high-frequency wave guide comprising a second wive guide communicating through a slot long compared to the operating wavelength in said first guide, the length of said slot being substantially equal to an integral number of half wavelengths of said operating wavelength as measured in said guide and an odd number of quarter wavelengths of said operating wavelength as measured in free space, a terminating impedance at one end of said second guide, means for deriving a signal proportional to the amplitude and independent of the polarity of the electromagnetic field of energy flowing in said second guide connected at the other end of said second guide, and an output circuit connected to said deriving means.

JERALD E. HILL.

References Cited in the file of this patent

UNITED STATES PATENTS

| Number | Name | Date |
|---|---|---|
| 2,151,118 | King et al. | Mar. 21, 1939 |
| 2,153,728 | Southworth | Apr. 11, 1939 |
| 2,375,223 | Hansen | May 8, 1945 |
| 2,418,484 | Samuel | Apr. 8, 1947 |
| 2,423,390 | Korman | July 1, 1947 |
| 2,423,526 | Sontheimer et al. | July 8, 1947 |

FOREIGN PATENTS

| Number | Country | Date |
|---|---|---|
| 545,936 | Great Britain | June 18, 1942 |

OTHER REFERENCES

Russian publication "Electrosvyaz," vol. IX, No. 4, April 1941, pages 9–15; R. T. P. Translation No. 1525, 9 pages, in class 171—95—23.